(12) United States Patent
Kataoka et al.

(10) Patent No.: US 10,572,408 B2
(45) Date of Patent: Feb. 25, 2020

(54) ELECTRICAL DEVICE AND RECEIVING DEVICE

(71) Applicant: OMRON Corporation, Kyoto (JP)

(72) Inventors: Nobuo Kataoka, Ritto (JP); Hideki Harada, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/869,076

(22) Filed: Jan. 12, 2018

(65) Prior Publication Data

US 2018/0267912 A1    Sep. 20, 2018

(30) Foreign Application Priority Data

Mar. 14, 2017   (JP) ................. 2017-048227

(51) Int. Cl.
   *G06F 13/20*    (2006.01)
   *H04B 3/54*     (2006.01)
   *G06F 13/40*    (2006.01)

(52) U.S. Cl.
   CPC .......... *G06F 13/20* (2013.01); *G06F 13/4068* (2013.01); *H04B 3/548* (2013.01)

(58) Field of Classification Search
   CPC ...... G06F 13/20; G06F 13/4068; H04B 3/548
   See application file for complete search history.

(56) References Cited

U.S. PATENT DOCUMENTS 3,659,277 A * 4/1972 Brown .................. G08C 19/26
                                                340/870.2
9,531,438 B2 * 12/2016 Mori ........................ H04B 3/56
2010/0061545 A1 * 3/2010 Kitchin ............... H04M 19/005
                                                379/413
2015/0381237 A1 * 12/2015 Griffith .................. H04B 3/546
                                                375/258

FOREIGN PATENT DOCUMENTS

CN          102299507          12/2011

OTHER PUBLICATIONS

"Search Report of Europe Counterpart Application", dated May 29, 2018, p. 1-p. 7.
"IO-Link Interface and System Specification," version 1.1.2, Jul. 2013, IO-Link Community, Order No. 10.002, 4 Overview of SDCI, pp. 32-37.
"Office Action of China Counterpart Application," with English translation thereof, dated Nov. 14, 2019, p. 1-p. 26.

* cited by examiner

*Primary Examiner* — Henry Tsai
*Assistant Examiner* — John B Roche
(74) *Attorney, Agent, or Firm* — JCIPRNET

(57) ABSTRACT

An electrical device configured to transmit or receive a signal related to an operation element and transmit a data signal using a small number of wirings is realized. An electrical device includes a first terminal and a second terminal to which a pair of signal lines are connected, an operation element connected between the first terminal and the second terminal, and a transmission circuit configured to operate using a voltage between the first terminal and the second terminal as a power source. The second terminal transmits an output signal according to a state of the operation element to the outside, and the transmission circuit superimposes a data signal on the output signal and transmits the data signal from the second terminal to the outside.

19 Claims, 13 Drawing Sheets

ELECTRICAL DEVICE AND RECEIVING DEVICE

CROSS-REFERENCE TO RELATED APPLICATION

This application claims the priority benefit of Japan application serial no. 2017-048227, filed on Mar. 14, 2017. The entirety of the above-mentioned patent application is hereby incorporated by reference herein and made a part of this specification.

BACKGROUND

Technical Field

The disclosure relates to an electrical device and a receiving device.

Description of Related Art

In the related art, there are three-wire type electrical devices (sensors or the like) configured to transmit and receive communication data in addition to detection information. Such electrical devices require at least two power lines and one signal line to supply electric power and input and output signals. One three-wire type communication method is IO-Link (registered trademark). Non-patent Document 1 is a specification of IO-Link.

[Non-patent Document 1] "IO-Link Interface and System Specification," version 1.1.2, July 2013, IO-Link Community, Order No: 10.002, 4 Overview of SDCI written on p32 to p37

However, in the technique of "IO-Link Interface and System Specification," version 1.1.2, July 2013, IO-Link Community, Order No: 10.002, 4 Overview of SDCI written on p32 to p37, there is a problem regarding an increase in the number of wirings. Furthermore, in the technique of "IO-Link Interface and System Specification," version 1.1.2, July 2013, IO-Link Community, Order No: 10.002, 4 Overview of SDCI written on p32 to p37, for example, a sensor converts a detection signal of the sensor into communication data and transmits the detection signal to the outside. Therefore, for the purpose of conversion processing, there is a problem in that the time until an external device recognizes the detection signal becomes long or a circuit configuration of the sensor and the external device becomes complicated.

SUMMARY

An electrical device according to an embodiment of the disclosure includes: a first terminal and a second terminal to which a pair of signal lines is connected; an operation element connected between the first terminal and the second terminal; and a transmission circuit configured to operate using a voltage between the first terminal and the second terminal as a power source, wherein a predetermined potential is input to the first terminal, the second terminal transmits an operation signal according to a state of the operation element to outside or an operation signal for controlling the operation element is input from the outside to the second terminal, and the transmission circuit superimposes a data signal on the operation signal and transmits the data signal from the second terminal to the outside.

A receiving device according to an embodiment of the disclosure may be connected to the electrical device via the pair of signal lines, wherein the receiving device receives the data signal superimposed on the operation signal from the electrical device, and the receiving device includes an extraction circuit configured to extract the data signal from a signal in which the operation signal and the data signal are superimposed.

DESCRIPTION OF THE EMBODIMENTS

Figure 1:
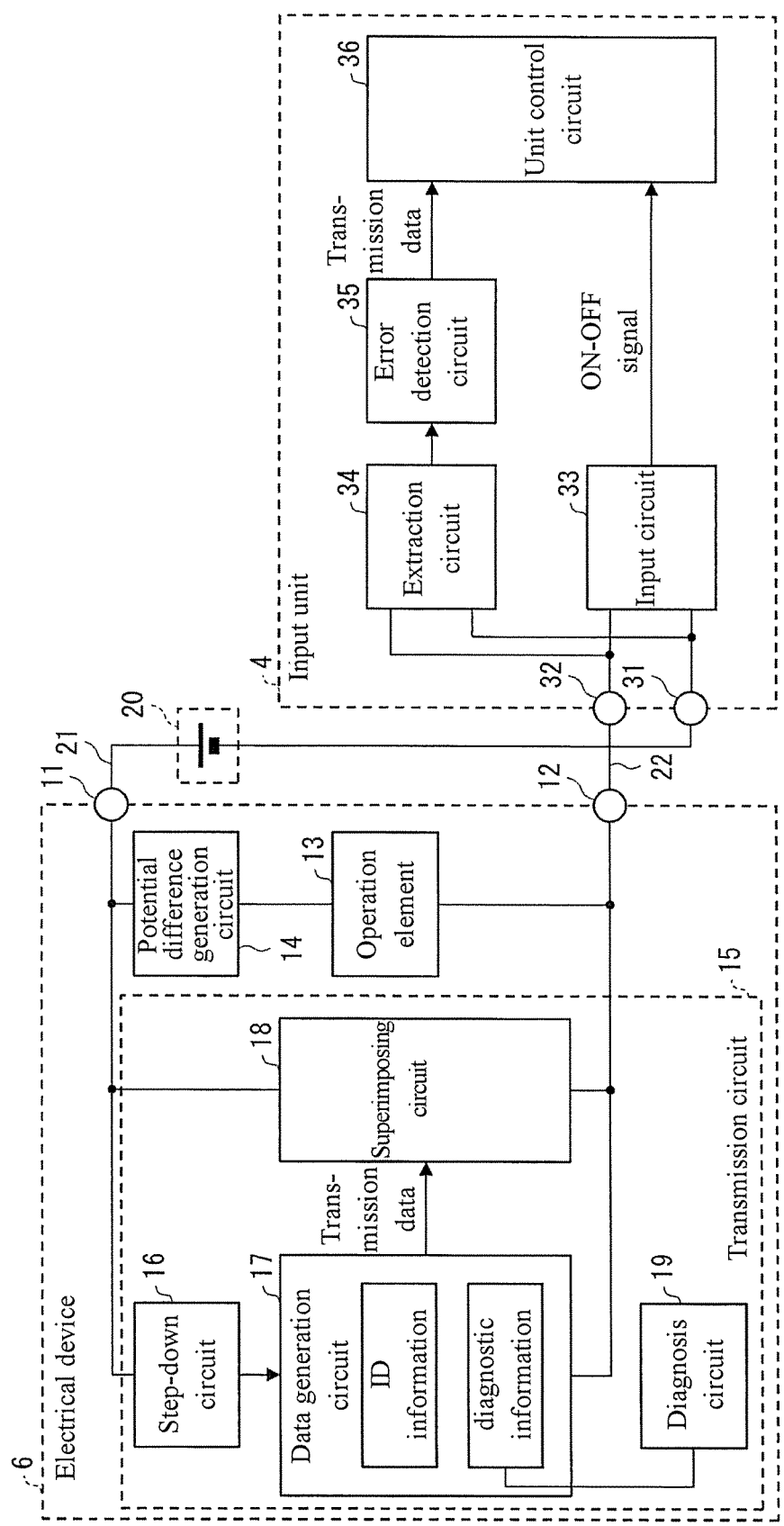
FIG. 1 is a block diagram showing a configuration of an electrical device and an input unit according to an embodiment of the disclosure.

According to an embodiment of the disclosure, an electrical device is realized, which is configured to transmit or receive a signal related to an operation element and transmit a data signal using a small number of wirings.

An electrical device according to an embodiment of the disclosure includes: a first terminal and a second terminal to which a pair of signal lines is connected; an operation element connected between the first terminal and the second terminal; and a transmission circuit configured to operate using a voltage between the first terminal and the second terminal as a power source, wherein a predetermined potential is input to the first terminal, the second terminal transmits an operation signal according to a state of the operation element to outside or an operation signal for controlling the operation element is input from the outside to the second and the transmission circuit superimposes a data signal on the operation signal and transmits the data signal from the second terminal to the outside.

In the electrical device according to an embodiment of the disclosure, the second terminal may transmit the operation signal according to the state of the operation element to the outside.

In the electrical device according to an embodiment of the disclosure, the operation element may be a switch, and the operation signal may be a signal representing an on or off state of the switch.

In the electrical device according to an embodiment of the disclosure, the transmission circuit may transmit the data signal to the outside only when the switch enters the on or off state.

In the electrical device according to an embodiment of the disclosure, the transmission circuit may transmit the data signal to the outside regardless of whether the switch is on or off.

In the electrical device according to an embodiment of the disclosure, the operation element may be a sensing element, and the operation signal may be a signal representing a sensing result by the sensing element.

In the electrical device according to an embodiment of the disclosure, the operation signal for controlling the operation element may be input from the outside to the second terminal.

In the electrical device according to an embodiment of the disclosure, the operation element may be a coil, a semiconductor switching element, or a light emitting element.

In the electrical device according to an embodiment of the disclosure, the operation element may be a coil configured to operate a relay, an electromagnetic valve, or an electric actuator.

The electrical device according to an embodiment of the disclosure may include: a potential difference generation circuit connected in series to the operation element in a conduction path between the first terminal and the second terminal, wherein the transmission circuit operates by a potential difference generated across both ends of the potential difference generation circuit.

In the electrical device according to an embodiment of the disclosure, the potential difference generation circuit may include a resistor, a transistor, or a diode.

In the electrical device according to an embodiment of the disclosure, the transmission circuit may include: a step-down circuit configured to step down the potential difference generated across both ends of the potential difference generation circuit to a predetermined voltage and to output the predetermined voltage to a data generation circuit; the data generation circuit configured to generate transmission data to be transmitted; and a superimposing circuit configured to superimpose the transmission data as the data signal on the operation signal.

In the electrical device according to an embodiment of the disclosure, wirings connected from the outside may be only the pair of signal lines.

In the electrical device according to an embodiment of the disclosure, the transmission circuit may operate using the voltage between the first terminal and the second terminal as the power source and may not require another power supply.

In the electrical device according to an embodiment of the disclosure, the data signal may represent a proper identifier to the electrical device or diagnostic information of the electrical device.

A receiving device according to an embodiment of the disclosure may be connected to the electrical device via the pair of signal lines, wherein the receiving device receives the data signal superimposed on the operation signal from the electrical device, and the receiving device includes an extraction circuit configured to extract the data signal from a signal in which the operation signal and the data signal are superimposed.

The receiving device according to an embodiment of the disclosure may include an error detection circuit configured to perform error detection on the data signal that is extracted.

According to an embodiment of the disclosure, it is possible to realize an electrical device configured to transmit or receive a signal related to an operation element and transmit a data signal using a small number of wirings.

Configuration of Control System 1

Figure 2:
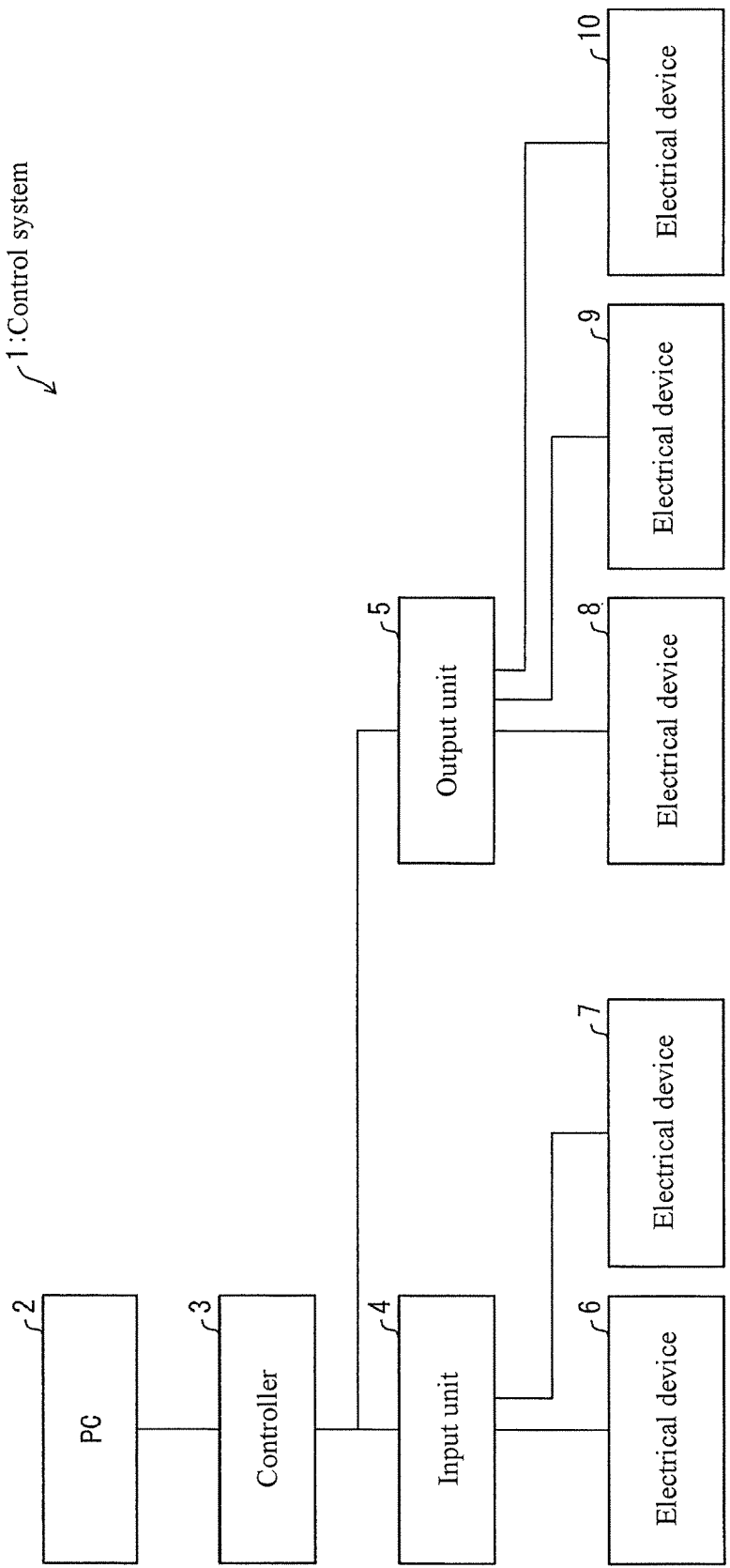
FIG. 2 is a block diagram showing a configuration of a control system according to an embodiment of the disclosure.

FIG. 2 is a block diagram showing a configuration of a control system according to an embodiment. A control system 1 includes a PC 2 (a personal computer, an information processing device), a controller 3, an input unit 4, an output unit 5, and electrical devices 6 to 10. The PC 2 is connected to the controller 3. The PC 2 receives information related to the electrical devices 6 to 10 from the controller 3 and transmits a control command to the controller 3. The controller 3 is connected to the input unit 4 and the output unit 5. The controller 3 transmits signals for operating or controlling the electrical devices 6 to 10 to the input unit 4 and the output unit 5 in accordance with the control command. The controller 3 transmits signals from the electrical devices 6 to 10 received via the input unit 4 or the output unit 5 to the PC 2.

The input unit 4 (a receiving device) is connected to the electrical devices 6 and 7. Each of the electrical devices 6 and 7 is connected to the input unit 4 through a pair of signal lines. The input unit 4 operates the electrical devices 6 and 7 and transmits signals received from the electrical devices 6 and 7 to the controller 3.

The electrical devices 6 and 7 are operated using electric power supplied from the input unit 4 and transmit signals corresponding to states of operation elements included in the electrical devices 6 and 7 to the input unit 4. Here, the electrical device 6 is a limit switch including a switch as an operation element. The electrical device 7 is a sensor including a sensing element as an operation element.

The output unit 5 (a receiving device) is connected to the electrical devices 8 to 10. Each of the electrical devices 8 to 10 is connected to the output unit 5 through a pair of signal lines. The output unit 5 operates the electrical devices 8 to 10 and controls the electrical devices 8 to 10 based on instructions from the PC 2 and the controller 3. Furthermore, the output unit 5 transmits signals received from the electrical devices 8 to 10 to the controller 3.

The electrical devices 8 to 10 are operated using electric power supplied from the output unit 5 and are controlled by a control signal received from the output unit 5. Here, the electrical device 8 is a relay device including a coil as an operation element. The electrical device 9 is an electromagnetic valve including a coil as an operation element. The electrical device 10 is an electric actuator including a coil as an operation element.

Configuration of Electrical Device 6 and Input Unit 4

FIG. 1 is a block diagram showing a configuration of the electrical device 6 and the input unit 4. Here, the electrical device 6 (a limit switch) and the input unit 4 will be described as an example. The electrical device 6 and the input unit 4 are connected to each other through a pair of signal lines 21 and 22. The signal line 21 is connected to a first input terminal 31 of the input unit 4 and a first terminal 11 of the electrical device 6. The signal line 22 is connected to a second input terminal 32 of the input unit 4 and a second terminal 12 of the electrical device 6. A power supply 20 is provided in a path of the signal line 21. The power supply 20 is a direct current (DC) power supply configured to generate a predetermined voltage (here, 24 V).

The electrical device 6 includes the first terminal 11, the second terminal 12, an operation element 13, a potential difference generation circuit 14, and a transmission circuit 15. The transmission circuit 15 includes a step-down circuit 16, a data generation circuit 17, a superimposing circuit 18, and a diagnosis circuit 19. The operation element 13 is connected between the first terminal 11 and the second terminal 12. The potential difference generation circuit 14 is connected in series to the operation element 13 in a conduction path between the first terminal 11 and the second terminal 12. A potential of the second terminal 12 changes in accordance with a state of the operation element 13. In other words, the second terminal 12 outputs an output signal (an operation signal) according to the state of the operation element 13 to the outside (the signal line 22).

The transmission circuit 15 is connected between the first terminal 11 and the second terminal 12. The transmission circuit 15 operates using a voltage between the first terminal 11 and the second terminal 12 as a power source. The step-down circuit 16 steps down the voltage between the first terminal 11 and the second terminal 12 to a predetermined voltage and outputs the predetermined voltage to the data generation circuit 17. The data generation circuit 17 operates by the voltage applied from the step-down circuit 16 and generates transmission data to be transmitted to the input unit 4. The transmission data includes, for example, a proper identifier (ID information) to the electrical device 6. The data generation circuit 17 outputs the transmission data to the superimposing circuit 18. The superimposing circuit 18 superimposes the received transmission data on the output signal as a data signal. Thus, the transmission circuit 15 outputs a superimposed signal obtained by superimposing the data signal on the output signal from the second terminal 12 to the signal line 22.

The diagnosis circuit 19 operates by the voltage applied from the step-down circuit 16 and generates diagnostic data representing diagnostic information of the electrical device 6. The diagnosis circuit 19 includes a check circuit associated with an element of the electrical device 6 (for example, the operation element 13) and generates diagnostic data indicating whether the electrical device 6 is normal depending on whether an output of the check circuit is normal. The diagnosis circuit 19 outputs diagnostic data (diagnostic information) to the data generation circuit 17. The data generation circuit 17 may include the diagnostic data in transmission data.

The input unit 4 includes the first input terminal 31, the second input terminal 32, an input circuit 33, an extraction circuit 34, an error detection circuit 35, and a unit control circuit 36. In FIG. 1, a configuration of a transmission part to the controller 3 is not shown. A potential of the first input terminal 31 is kept constant (for example, GND). A superimposed signal is input from the signal line 22 to the second input terminal 32.

The input circuit 33 extracts an output signal from the superimposed signal and outputs the output signal to the unit control circuit 36. The extraction circuit 34 extracts the data signal from the superimposed signal and outputs the data signal to the error detection circuit 35. The error detection circuit 35 performs error detection on the data signal using an arbitrary data checking method such as a CRC check (a cycle redundancy check) or a Manchester code check. The error detection circuit 35 outputs the data signal and the error detection result to the unit control circuit 36. The error detection circuit 35 may not output the data signal to the unit control circuit 36 when an error is detected from the data signal. The unit control circuit 36 outputs the output signal and the data signal to the controller 3. The error detection circuit 35 and the unit control circuit 36 may be constituted of, for example, one integrated circuit (IC) or a plurality of ICs.

Circuit Configuration of Electrical Device 6

Figure 3:
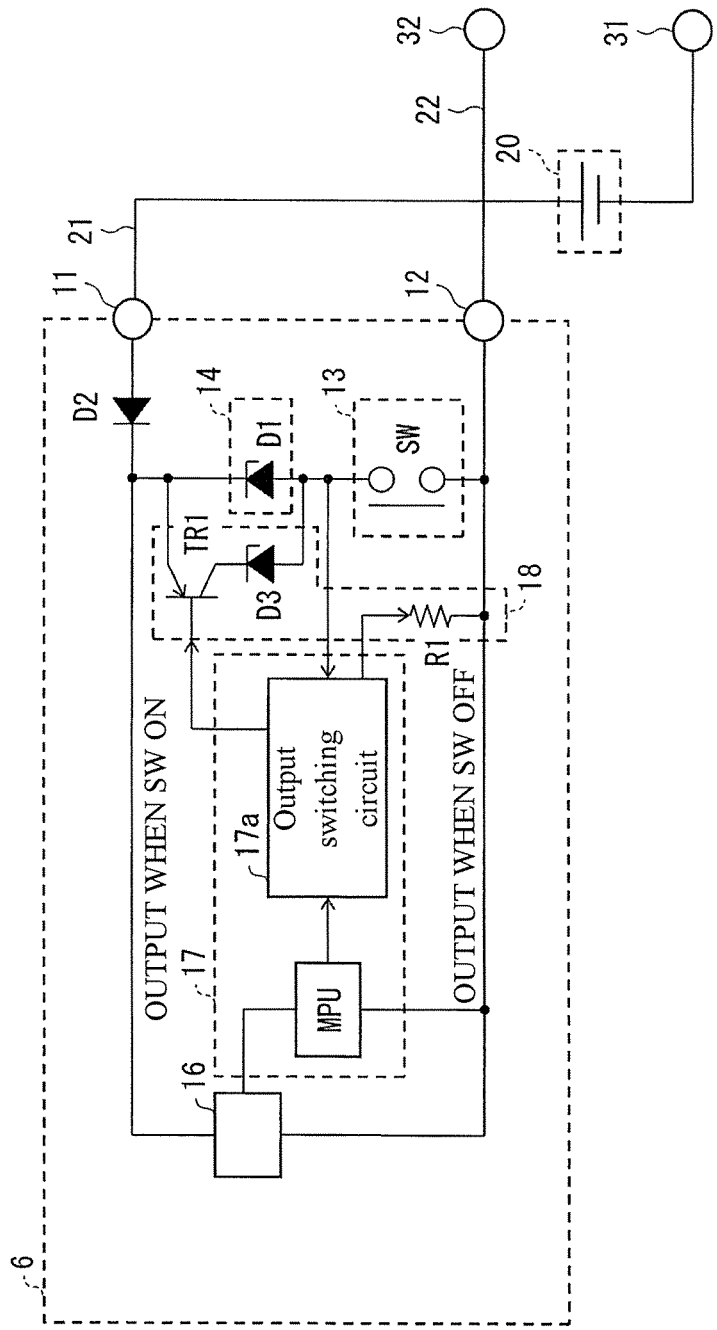
FIG. 3 is a circuit diagram showing a configuration of an electrical device.

FIG. 3 is a circuit diagram showing a configuration of the electrical device 6. In FIG. 3, the diagnosis circuit 19 is not shown. The potential difference generation circuit 14 includes a diode D1. The diode D1 is a Zener diode. Here, the operation element 13 is a mechanical switch SW. In the conduction path between the first terminal 11 and the second terminal 12, a diode D2, the diode D1, and the switch SW are arranged in series in this order. An anode of the diode D2 is connected to the first terminal 11. A cathode of the diode D1 is connected to the first terminal 11 via the diode D2.

The step-down circuit 16 is arranged between the first terminal 11 and the second terminal 12 in parallel with the diode D1 and the switch SW.

The data generation circuit 17 includes a micro processing unit (MPU) and an output switching circuit 17a. A step-down constant voltage (for example, 2.5 V) is supplied as a power source from the step-down circuit 16 to the MPU and the output switching circuit 17a. The MPU generates transmission data and outputs the transmission data to the superimposing circuit 18 via the output switching circuit 17a. A voltage of a node between the switch SW and the diode D1 is input to the output switching circuit 17a. The output switching circuit 17a determines whether the switch SW is on or off based on the voltage. The output switching circuit 17a changes an output destination of the transmission data in accordance with whether the switch SW is on or off. The output switching circuit 17a outputs the transmission data to a base terminal of a transistor TR1 when the switch SW is on. The output switching circuit 17a outputs the transmission data to a resistor R1 when the switch SW is off.

The superimposing circuit 18 includes the resistor R1, a diode D3, and the transistor TR1. The diode D3 is a Zener diode. One end of the resistor R1 is connected to the output switching circuit 17a and the other end of the resistor R1 is connected to the second terminal 12.

The base terminal of the transistor TR1 is connected to the output switching circuit 17a. An emitter terminal of the transistor TR1 is connected to the first terminal 11 via the diode D2 and a collector terminal of the transistor TR1 is connected to a cathode of the diode D3. An anode of the diode D3 is connected to a node between the switch SW and the diode D1.

The diode D2 is a protective element and can be omitted.

Circuit Configuration of Input Unit 4

Figure 4:
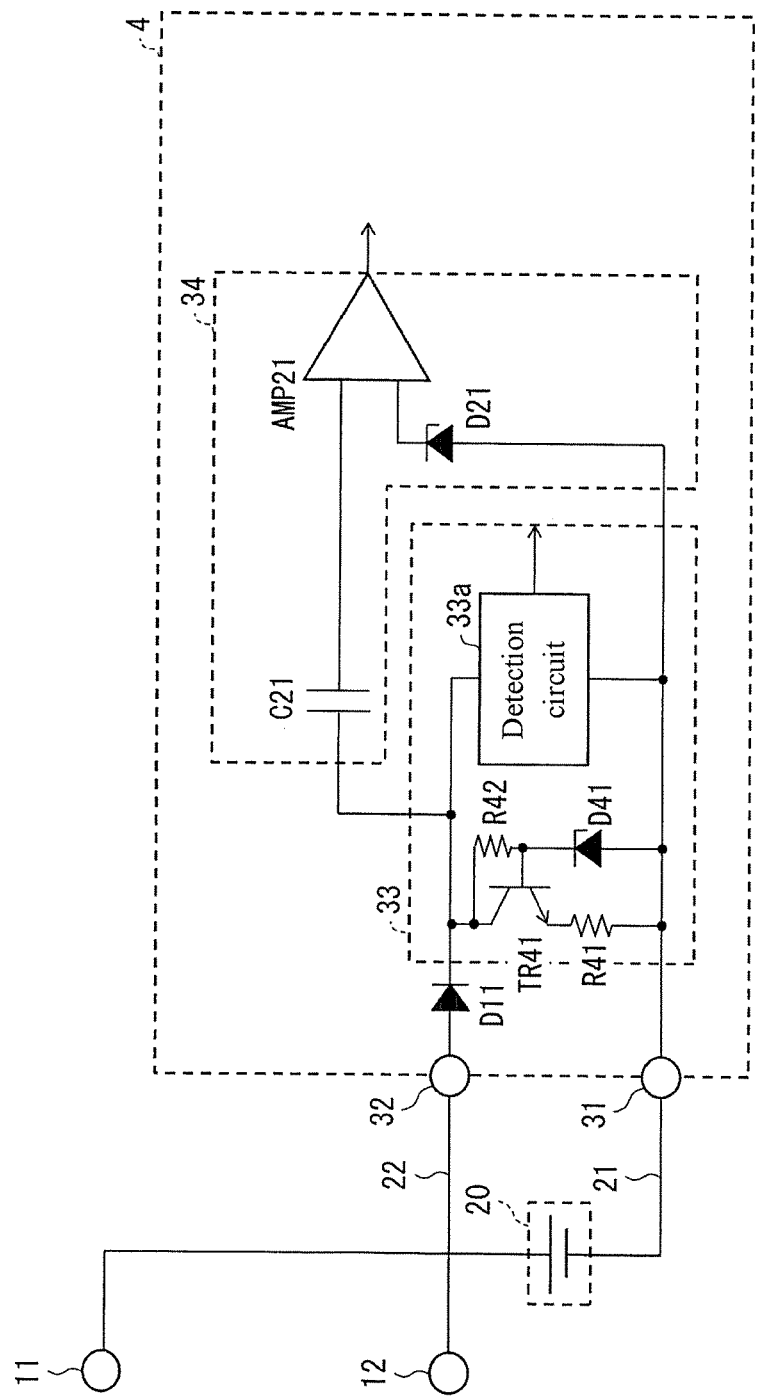
FIG. 4 is a circuit diagram showing a configuration of an input unit.

FIG. 4 is a circuit diagram showing a configuration of the input unit 4. Here, in the input unit 4, the input circuit 33 and the extraction circuit 34 are shown. An anode of a diode D11 serving as a protective element is connected to the second input terminal 32.

The input circuit 33 includes resistors R41 to R42, a diode D41, a transistor TR41, and a detection circuit 33a. The diode D41 is a Zener diode. A collector terminal of the transistor TR41 is connected to a cathode of the diode D11 and an emitter terminal of the transistor TR41 is connected to one end of a resistor R41. The other end of the resistor R41 is connected to the first input terminal 31. One end of a resistor R42 is connected to the cathode of the diode D11 and the other end of the resistor R42 is connected to a cathode of the diode D41. An anode of the diode D41 is connected to the first input terminal 31. A base terminal of the transistor TR41 is connected to the other end of the resistor R42. The resistors R41 to R42, the diode D41, and the transistor TR41 constitute a constant current circuit. A current flowing through the constant current circuit becomes constant when a predetermined voltage or more is applied to both ends of the constant current circuit. The resistor R42, the diode D41, and the transistor TR41 may be omitted and only the resistor R41 may be connected in parallel to the detection circuit 33a. In addition, the constant current circuit may be connected in series to the detection circuit 33a and only the resistor R41 may be connected in series to the detection circuit 33a.

The detection circuit 33a determines whether the switch SW is on or off based on a voltage between the first input terminal 31 and the second input terminal 32. The detection circuit 33a outputs the determination result (information on whether the switch SW is on or off).

The extraction circuit 34 includes a capacitor C21, the diode D21, and an operational amplifier AMP 21. The diode D21 is a Zener diode. One end of the capacitor C21 is connected to the cathode of the diode D11 and the other end of the capacitor C21 is connected to an inverting input terminal of the operational amplifier AMP 21. A cathode of the diode D21 is connected to a non-inverting input terminal of the operational amplifier AMP 21. An anode of the diode D21 is connected to the first input terminal 31.

Operation of Electrical Device 6 and Input Unit 4

The electrical device 6 is a limit switch. The switch SW is mechanically switched on/off in accordance with a position of an object. The first input terminal 31 of the input unit 4 is set to 0 V and a constant potential (24 V) is input to the first terminal 11. A potential of the second terminal 12 changes in accordance with whether the switch SW is on or off (conduction/cutoff).

A potential difference between both ends of the switch SW in a conduction state is 0 when the switch SW is on. For this reason, the potential of the second terminal 12 becomes a value which is voltage-dropped from a potential of the first terminal 11 by the potential difference generation circuit 14 (the diode D1).

No current flows through the switch SW and the potential difference generation circuit 14 when the switch SW is off. For this reason, when the switch SW is off, the potential of the second terminal 12 becomes lower than that when the switch SW is on.

In this way, the second terminal 12 transmits an output signal according to whether the switch SW is on or off to the outside. A state in which the switch is on is represented if the potential of the output signal is H (High) and a state in which the switch is off is represented if the potential of the output signal is L (Low). Since the value of the potential of the output signal represents the state (ON/OFF) of the switch, it can be said that the output signal is an analog signal.

On the other hand, a potential difference is generated between both ends of the potential difference generation circuit 14 regardless of the state of the switch SW. For this reason, a voltage equal to or greater than a certain value (for example, 2.5 V) is applied to the step-down circuit 16 regardless of whether the switch SW is on or off. Therefore, the step-down circuit 16 can output at least the voltage (2.5 V) at which the data generation circuit 17 can operate regardless of whether the switch SW is on or off. Thus, the data generation circuit 17 and the superimposing circuit 18 can operate regardless of whether the switch SW is on or off.

The MPU generates transmission data. The transmission data is digital data. The output switching circuit 17a outputs the transmission data as an H/L voltage from an output terminal according to whether the switch SW is on or off.

The output switching circuit 17a outputs the transmission data to the resistor R1 when the switch SW is off A current flowing through the resistor R1 changes in accordance with a voltage output from the output switching circuit 17a. Thus, a potential of the second terminal 12 also changes in accordance with H/L of the transmission data. As a result, the transmission data is superimposed on the output signal as a data signal.

The output switching circuit 17a outputs the transmission data to the base terminal of the transistor TR1 when the switch SW is on. The transistor TR1 enters an on or off state in accordance with H/L of the transmission data. At this time, a current flowing through the diode D3 changes in accordance with H/L of the transmission data. Thus, a potential of the second terminal 12 also changes in accordance with H/L of the transmission data. As a result, the transmission data is superimposed on the output signal as a data signal. The electrical device 6 outputs a superimposed signal obtained by superimposing the output signal and the data signal from the second terminal 12.

Figure 5:
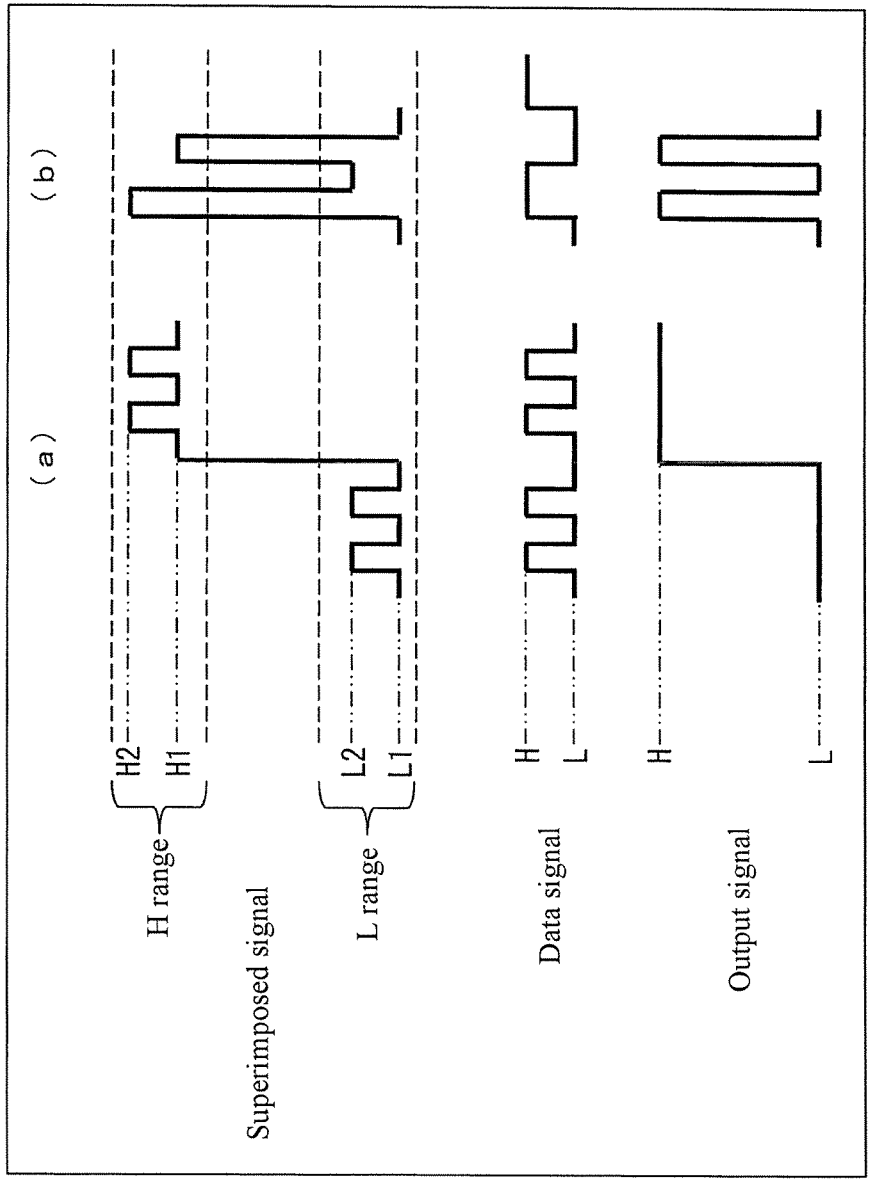
FIG. 5 is a diagram schematically illustrating an example of signal waveforms.

FIG. 5 is a diagram schematically illustrating an example of signal waveforms. (a) of FIG. 5 illustrates a case in which the period of the output signal is longer than the period of the data signal and (b) of FIG. 5 illustrates a case in which the period of the output signal is shorter than the period of the data signal. The superimposed signal is obtained by superimposing the output signal and the data signal. A waveform of the superimposed signal is obtained by superimposing a waveform of the output signal and a waveform of the data signal. An amplitude of the output signal is larger than an amplitude of the data signal. For this reason, a value of the original output signal and a value of the data signal can be known from the superimposed signal. The output signal becomes H when the switch SW is on and the output signal becomes L when the switch SW is off.

Values of the superimposed signal are classified into L1, L2, H1, and H2 from the lower side. The output signal is L when the superimposed signal is in an L range. The L range includes L1 and L2. The output signal is H when the superimposed signal is in an H range higher than the L range. The H range includes H1 and H2. The data signal is L when the superimposed signal is L1 or H1. The data signal is H when the superimposed signal is L2 or H2.

The input unit 4 receives the superimposed signal from the electrical device 6 at the second input terminal 32. The input circuit 33 determines whether the output signal is H or L (whether the switch SW is on or off) based on the superimposed signal and outputs the determination result to the unit control circuit 36. To be specific, the detection circuit 33a outputs the determination result. The extraction circuit 34 extracts the data signal from the superimposed signal via the capacitor C21 and outputs the data signal to the error detection circuit 35. To be specific, the operational amplifier AMP 21 outputs the data signal (transmission data). The diode D21 sets a threshold voltage used when the operational amplifier AMP 21 determines whether the data signal is H or L.

The resistors R41 to R42, the diode D41, and the transistor TR41 constitute a constant current circuit. The constant current circuit limits a current input to the second input terminal 32. Furthermore, the constant current circuit sets an amplitude of the output signal output by the electrical device 6. The resistor R41 functions in the same way even when the resistor R41 is used instead of the constant current circuit.

Figure 6:
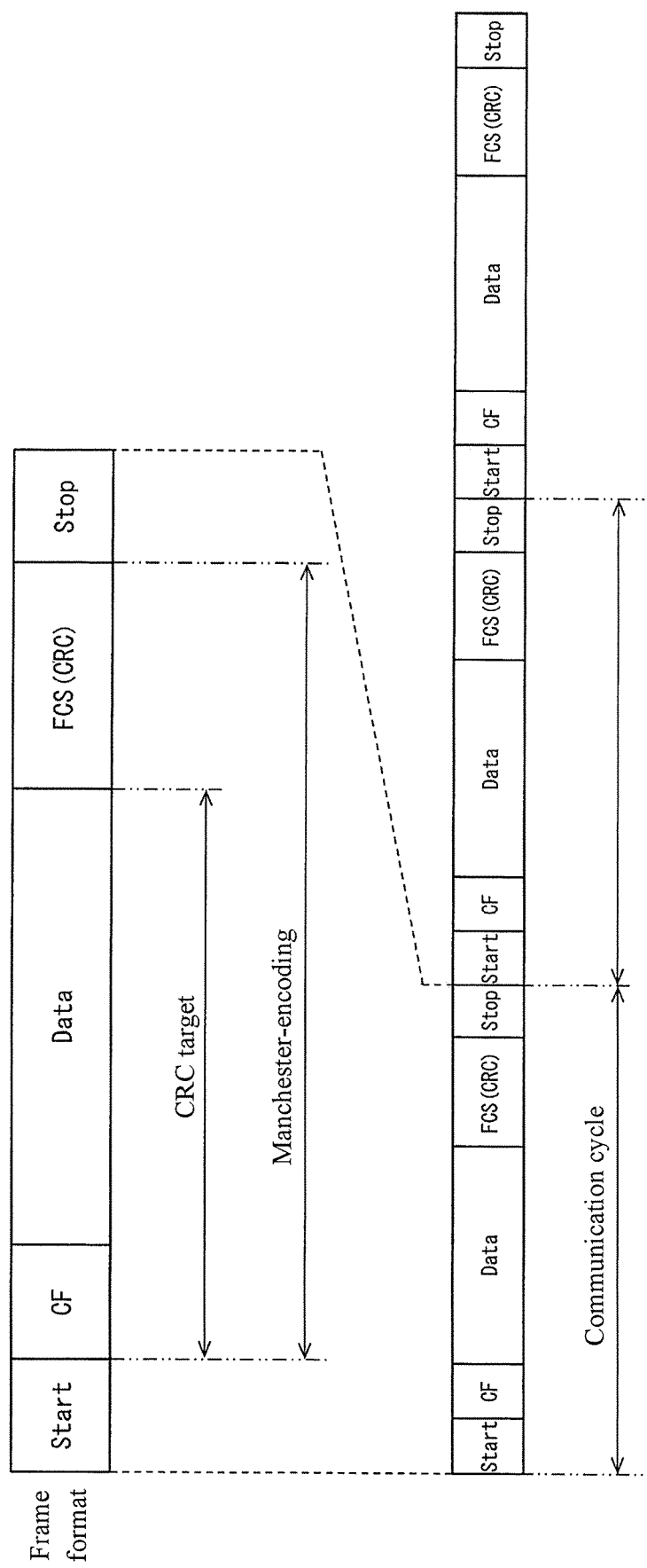
FIG. 6 is a diagram showing a format of transmission data.

FIG. 6 is a diagram showing a format of transmission data. The transmission data is generated for each frame and transmitted from the electrical device 6 to the input unit 4. Transmission data of one frame starts with a Start code and ends with a Stop code. The transmission data includes a control code in a CF portion. The control code indicates whether the content of Data includes only an identifier or diagnostic data in addition to an identifier. A length of Data is undefined. The transmission data includes a proper identifier to the electrical device 6, diagnostic data, and/or the like in a Data portion. The transmission data includes data for error control (a CRC check) in an FCS portion. In the transmission data, the CF, Data, and FCS portions are Manchester-encoded. Here, transmission data of a plurality of frames is transmitted continuously without an inter-frame gap. The format of such transmission data is an example and any format can be used without being limited to such a format.

Figure 7:
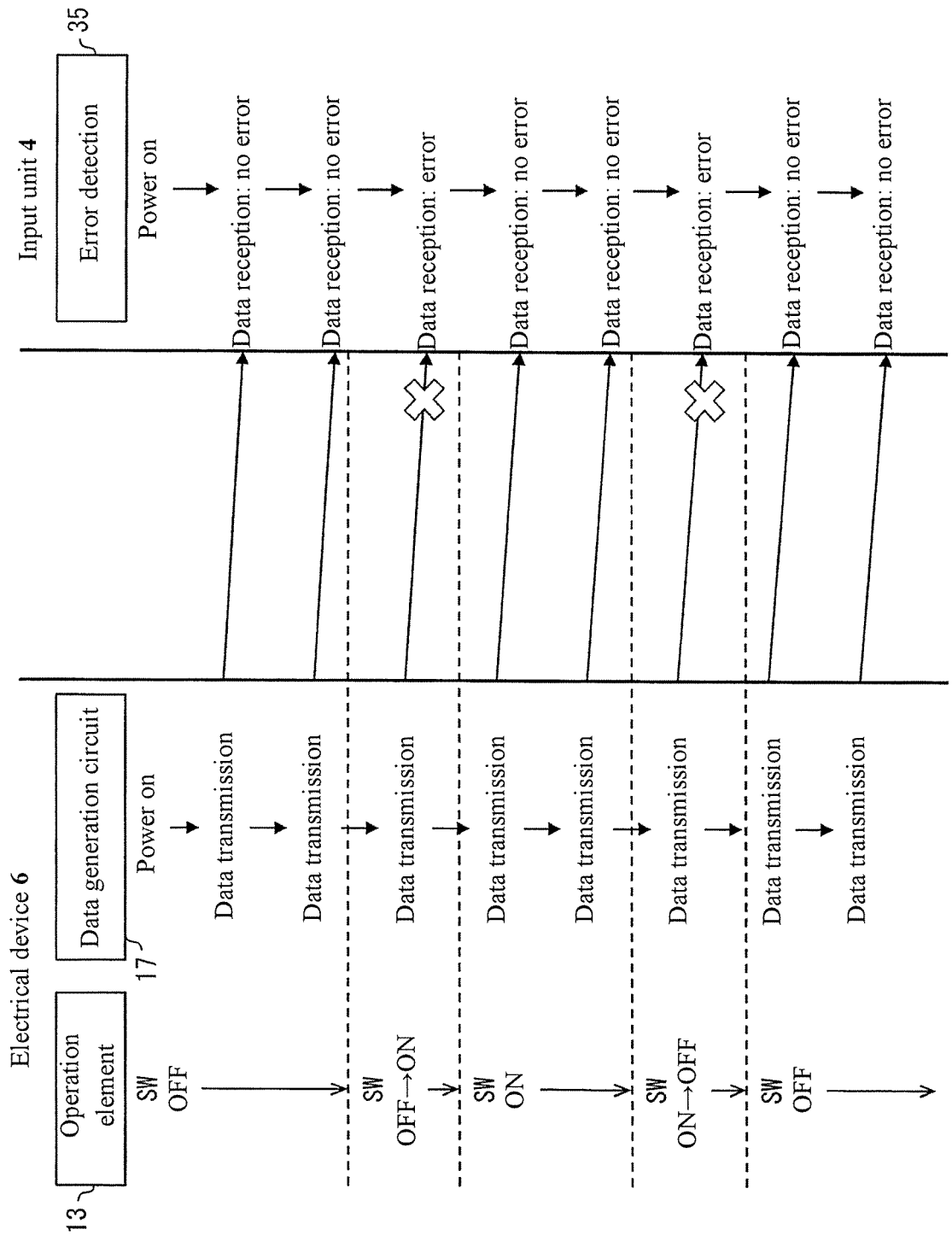
FIG. 7 is a diagram illustrating a communication operation sequence between an electrical device and an input unit.

FIG. 7 is a diagram showing a communication operation sequence between the electrical device 6 and the input unit 4. The data generation circuit 17 repeatedly transmits transmission data containing an identifier to the input unit 4 when the power supply of the input unit 4 and the electrical device 6 is on. The error detection circuit 35 of the input unit 4 performs a Manchester code and CRC check on the transmission data. The error detection circuit 35 outputs transmission data to the unit control circuit 36 if there is no error.

The output signal indicating the state of the switch SW changes greatly when the switch SW changes from the on state to the off state or from the off state to the on state. For this reason, the transmission data transmitted during a period immediately after a period in which the switch SW (the operation element 13) changes is highly likely to contain an error. The error detection circuit 35 discards the transmission data if the transmission data contains an error.

Effect

In the electrical device 6, the transmission circuit 15 operates by a voltage of the pair of signal lines 21 and 22 for transmitting the output signal as a power source. The transmission circuit 15 can generate a data signal indicating information different from the output signal indicating the state of the operation element 13 and transmit the generated data signal to the input unit 4. For this reason, there is no need to provide another power supply for operating the transmission circuit 15 in the electrical device 6 or to connect another wiring for supplying electric power to the electrical device 6. Therefore, the electrical device 6 can transmit the output signal and the data signal using fewer wirings (using the pair of signal lines 21 and 22) than a conventional electrical device. In an example of the embodiment, wirings connected externally to the electrical device 6 are only the pair of signal lines 21 and 22.

The transmission circuit 15 operates by a voltage generated across both ends of the potential difference generation circuit 14 connected in series to the operation element 13. For this reason, the transmission circuit 15 can transmit the data signal to the input unit 4 regardless of the state of the operation element 13 (regardless of whether the switch SW is on or off). The input unit 4 can transmit the data signal (transmission data) to an upstream device (the controller 3 or the PC 2).

Also, the electrical device 6 transmits the output signal with a potential corresponding to whether the switch SW is on or off. Therefore, unlike a conventional technique (IO-Link) in which an ON/OFF signal is converted into digital communication data, ON/OFF information of the switch SW can be transmitted to the input unit 4, the controller 3, and the PC 2 quickly. Furthermore, since there is no need to convert an ON/OFF signal into communication data, it is possible to make circuits of the electrical device 6 and the input unit 4 small and simple.

The PC 2 or the controller 3 can detect an abnormality occurring in the electrical device 6 from the diagnostic data included in the transmission data when the electrical device 6 includes the diagnosis circuit 19. The PC 2 can detect a precursor of failure of the electrical device 6 from the diagnostic data (for example, an ON/OFF switching speed of the switch SW) even when the electrical device 6 is still operating normally. The PC 2 informs a user of the detected abnormality (including a precursor of failure) using a display/voice. Thus, the user can replace the electrical device 6 before the production line abnormally stops.

The control system 1 can detect an abnormality as follows even when the electrical device 6 does not include the diagnosis circuit 19. For example, when there is an abnormality in which ON/OFF of the limit switch (the electrical device 6) cannot be detected on the controller 3 side, it can be determined using the PC 2 or the controller 3 whether the abnormality (disconnection/short circuit) has occurred in the signal line 21 or 22 or the abnormality has occurred in the electrical device 6 itself. The electrical device 6 periodically (continuously) transmits the identifier of the electrical device 6 as the transmission data to the input unit 4. For example, the PC 2 or the controller 3 may determine that there is an abnormality in the signal line 21 or 22 when the identifier cannot be received. When the PC 2 or the controller 3 can receive the identifier but cannot detect whether the limit switch (the electrical device 6) is on or off, it may be determined that there is an abnormality in the electrical device 6 itself. The PC 2 can notify the user of information indicating where the abnormality is using a display or a voice. Thus, the user can quickly prepare and perform the restoration work and shorten the time for which the production line is stopped.

Usage Example of Identifier

Figure 8:
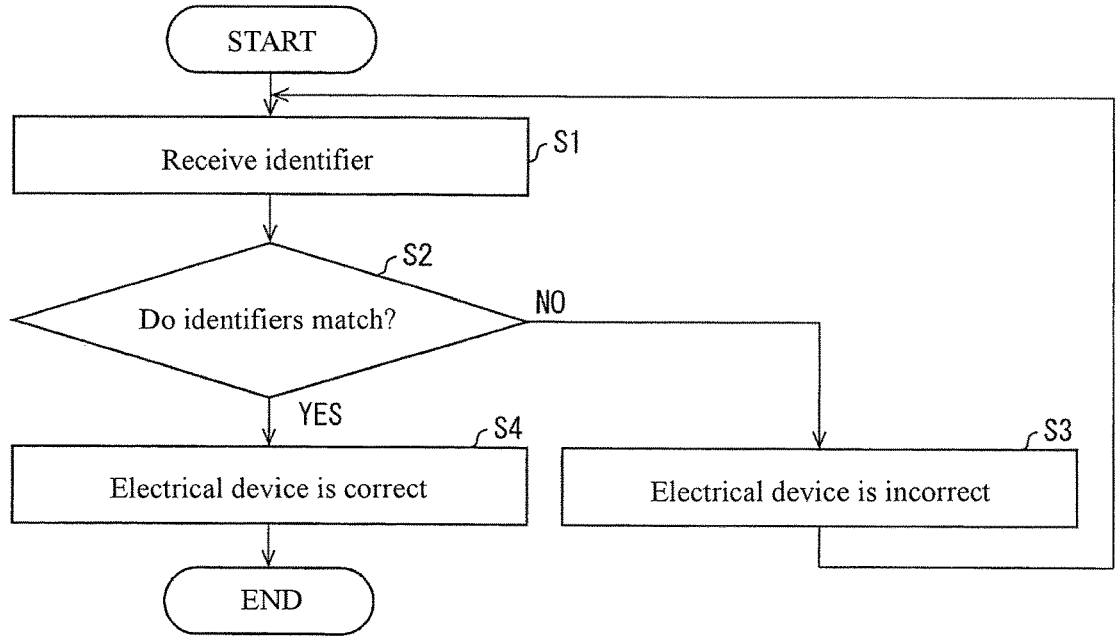
FIG. 8 is a diagram for describing a flow of inspecting a production line using an identifier when the production line is constructed.

FIG. 8 is a diagram for describing a flow of inspecting a production line using an identifier when the production line is constructed. In the production line, a predetermined electrical device should be installed in a predetermined place. An identifier for the electrical device to be connected to the input unit 4 is registered in the PC 2 in advance. The identifier mentioned herein corresponds to the type of the electrical device.

After the electrical device 6 is installed in the predetermined place and connected to the input unit 4, the PC 2 receives the identifier of the electrical device 6 from the electrical device 6 via the controller 3 and the input unit 4 (S1). The PC 2 determines whether the received identifier matches the identifier of the electrical device to be connected which is registered in advance (S2).

If the identifiers do not match (NO in S2), the electrical device 6 connected to the input unit 4 is not correct (the type is different). For this reason, the PC 2 informs the user that the electrical device 6 connected to the input unit 4 is incorrect using a display/voice (S3). Thus, the control system 1 can prompt the user to replace the electrical device 6.

The user exchanges the electrical device 6 with an appropriate one. The process of the PC 2 returns to the process of S1 when a new electrical device 6 is connected to the input unit 4, and the identifier is confirmed again.

The electrical device 6 connected to the input unit 4 is determined to be correct when the identifiers match (YES in S2). Therefore, the PC 2 notifies the user that the electrical device 6 connected to the input unit 4 is correct using a display/voice (S4). Thus, the user can confirm that the connected electrical device 6 is correct. When another electrical device is connected to the input unit 4, the control system 1 checks whether the electrical device is correct in the same manner.

Figure 9:
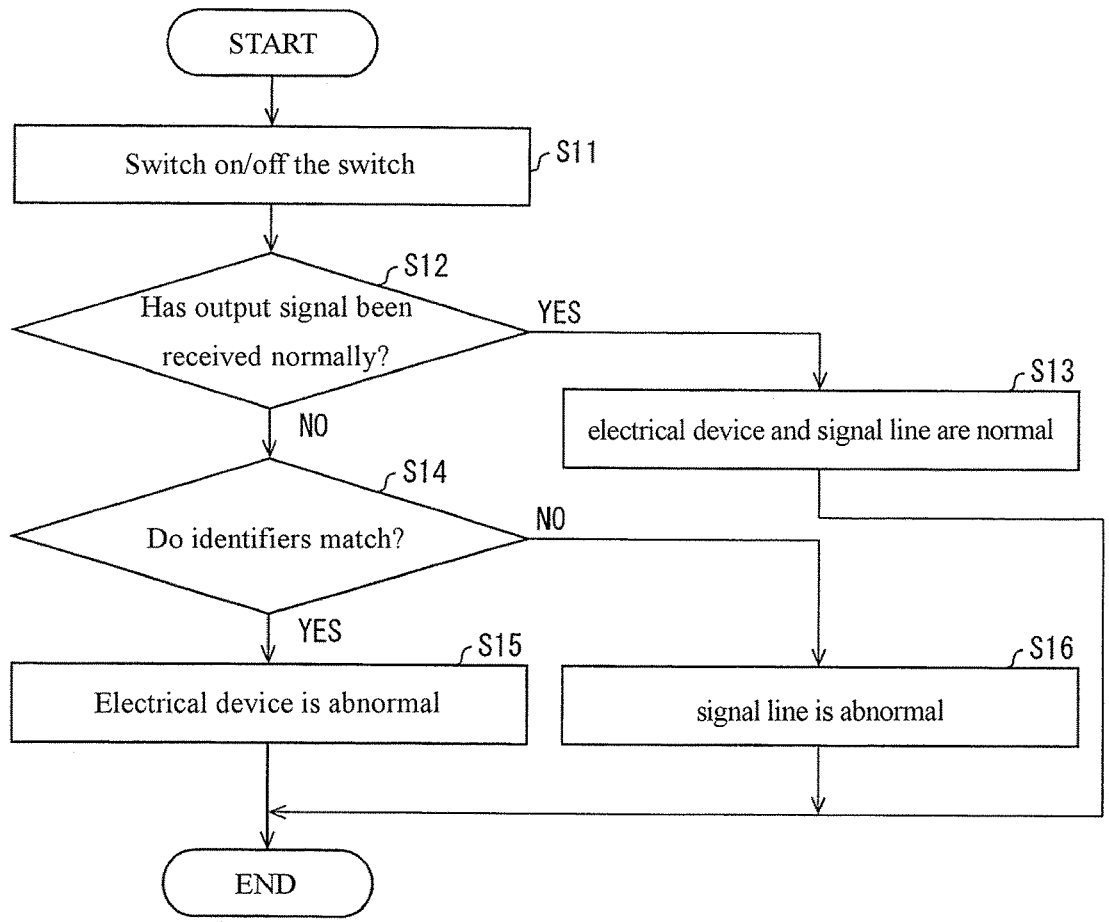
FIG. 9 is a diagram for describing a flow of inspecting an electrical device while the production line is stopped.

FIG. 9 is a diagram for describing a flow of inspecting the electrical device 6 while the production line is stopped. Here, a case after the production line has been in operation is considered. The user sets the PC2 to an inspection mode while the production line is stopped to attempt to switch the switch SW of the electrical device 6 (the limit switch) on/off (S11). The electrical device 6 transmits a superimposed signal (an output signal+a data signal) to the input unit 4 in accordance with whether the switch SW is on or off. The data signal includes an identifier. The PC 2 in the inspection mode determines whether the output signal corresponding to the switching of ON/OFF of the switch SW has been received normally (S12).

The PC 2 informs the user that the electrical device 6 and the signal line 21 or 22 are normal using a display/voice (S13) when the output signal has been received normally (YES in S12).

The PC 2 determines whether the received identifier matches the identifier of the electrical device registered in advance (S14) when the output signal has not been received normally (NO in S12).

The PC 2 determines that there is an abnormality in the electrical device 6 when the identifiers match (YES in S14). Since the data signal containing the identifier is transmitted normally, the signal line 21 or 22 is determined to be normal. Furthermore, it can be determined that, although the transmission circuit 15 of the electrical device 6 is normal, there is an abnormality in the operation element 13 of the electrical device 6. The PC 2 informs the user that an abnormality has occurred in the electrical device 6 (particularly, the operation element 13) using a display/voice (S15).

The PC 2 determines that there is an abnormality in the signal line 21 or 22 when the identifiers do not match (NO in S14). The PC 2 informs the user that an abnormality has occurred in the signal line 21 or 22 using a display/voice (S16).

In this way, in the control system 1, it is possible to identify a device or a wiring in which an abnormality has occurred using the identifier transmitted by the electrical device 6. Therefore, the user can repair a failure promptly.

Modified Example

A transmission circuit may be configured to transmit a data signal only when a switch SW is in any of the on and off states.

The transmission circuit can transmit arbitrary information as transmission data.

Also, a potential difference generation circuit includes a resistor, a transistor, and/or a diode as impedance elements. The potential difference generation circuit generates a potential difference at both ends by a current flowing through the potential difference generation circuit. Alternatively, the potential difference generation circuit generates a potential difference at both ends by cutting off a current passing through the potential difference generation circuit in accordance with an operation of an operation element.

In the electrical device 6, superimposition of transmission data when the switch SW is on is performed with a voltage output and superimposition of transmission data when the switch SW is off is performed with a current output. The disclosure is not limited thereto, and the voltage output and the current output may be exchanged or both may be the voltage output or the current output.

Figure 13:
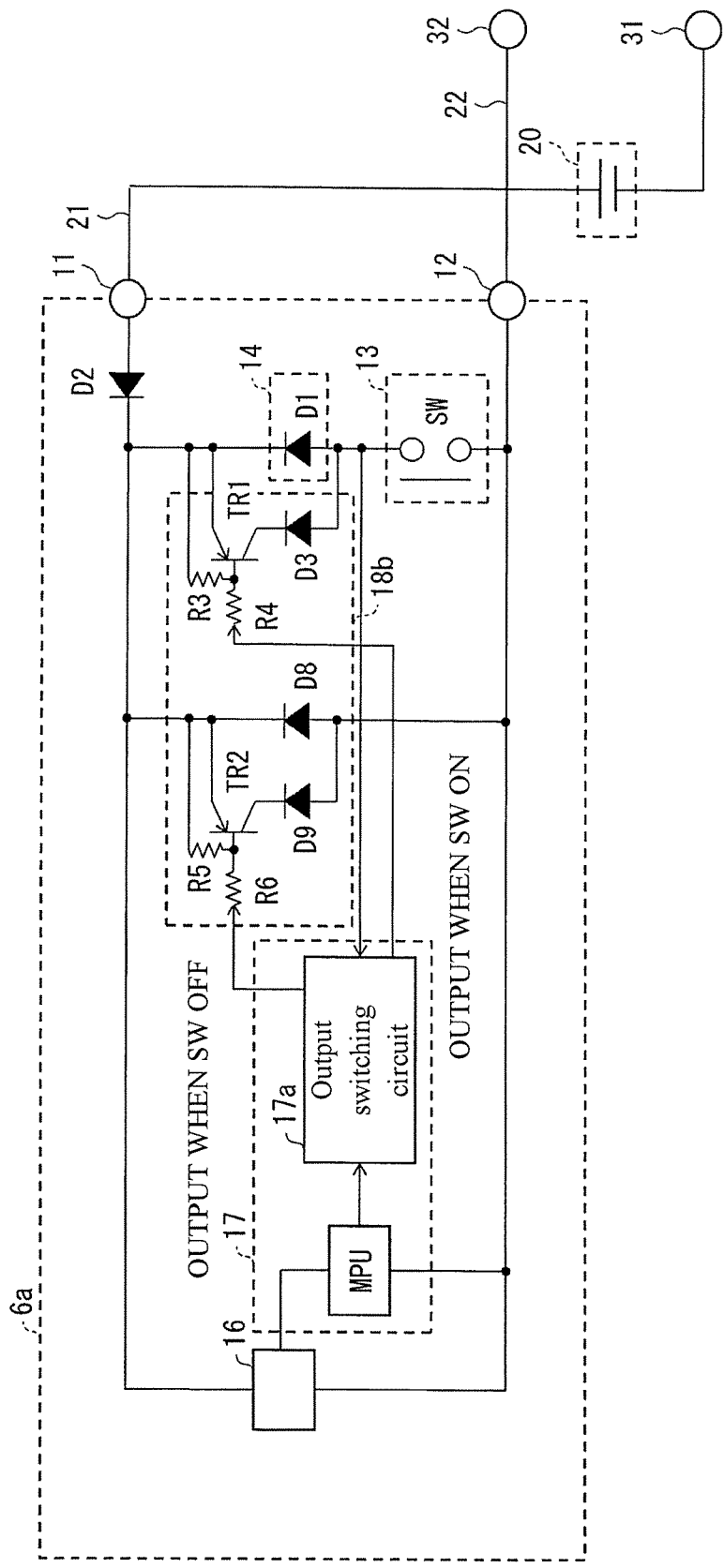
FIG. 13 is a circuit diagram illustrating a modified example of an electrical device.

FIG. 13 is a circuit diagram showing a configuration of an electrical device 6a according to the modified example. Here, a superimposing circuit 18b includes diodes D8 and D9, resistors R5 and R6, and a transistor TR2 (a voltage output) instead of the resistor R1 (the current output) of the superimposing circuit 18. Furthermore, the superimposing circuit 18b includes a resistor R3 between a base terminal of the transistor TR1 and a first terminal 11, and a resistor R4 connected to the base terminal. A set of diodes D1 and D3, the resistors R3 and R4, and the transistor TR1 and a set of diodes D8 and D9, resistors R5 and R6, and the transistor TR2 have the same circuit configuration. An output switching circuit 17a outputs transmission data to the base terminal of the transistor TR1 via the resistor R4 when the switch SW is on. The output switching circuit 17a outputs transmission data to a base terminal of the transistor TR2 via the resistor R6 when the switch SW is off. The diodes D1, D3, D8, and D9 function as constant voltage sources. A Zener diode or a reference voltage IC can be used as the diodes D1, D3, D8, and D9. Voltages of the constant voltage sources satisfy the following conditions.

$$VREF1 > VREF2 + VCETR1,$$

$$VREF3 > VREF4 + VCETR2,$$

$$VREF3 > VREF4 \gg VREF1 > VREF2.$$

Here, VREF1 to VREF4 are reference voltages provided as constant voltage sources by the diodes D1, D3, D8, and D9. VCETR1 and VCETR2 are collector-emitter voltages of the transistors TR1 and TR2. The resistor R3 to R6 are resistors configured to divide voltages of the transistors TR1 and TR2 and limit currents thereof. The transistors TR1 and TR2 function as switch elements configured to switch H/L states of a data signal. An amplitude of a waveform of the data signal is VppON when the switch SW is on and VppOFF when the switch SW is off.

$$VppON = VREF1 - (VREF2 + VCETR1),$$

$$VppOFF = VREF3 - (VREF4 + VCETR2).$$

Figure 14:
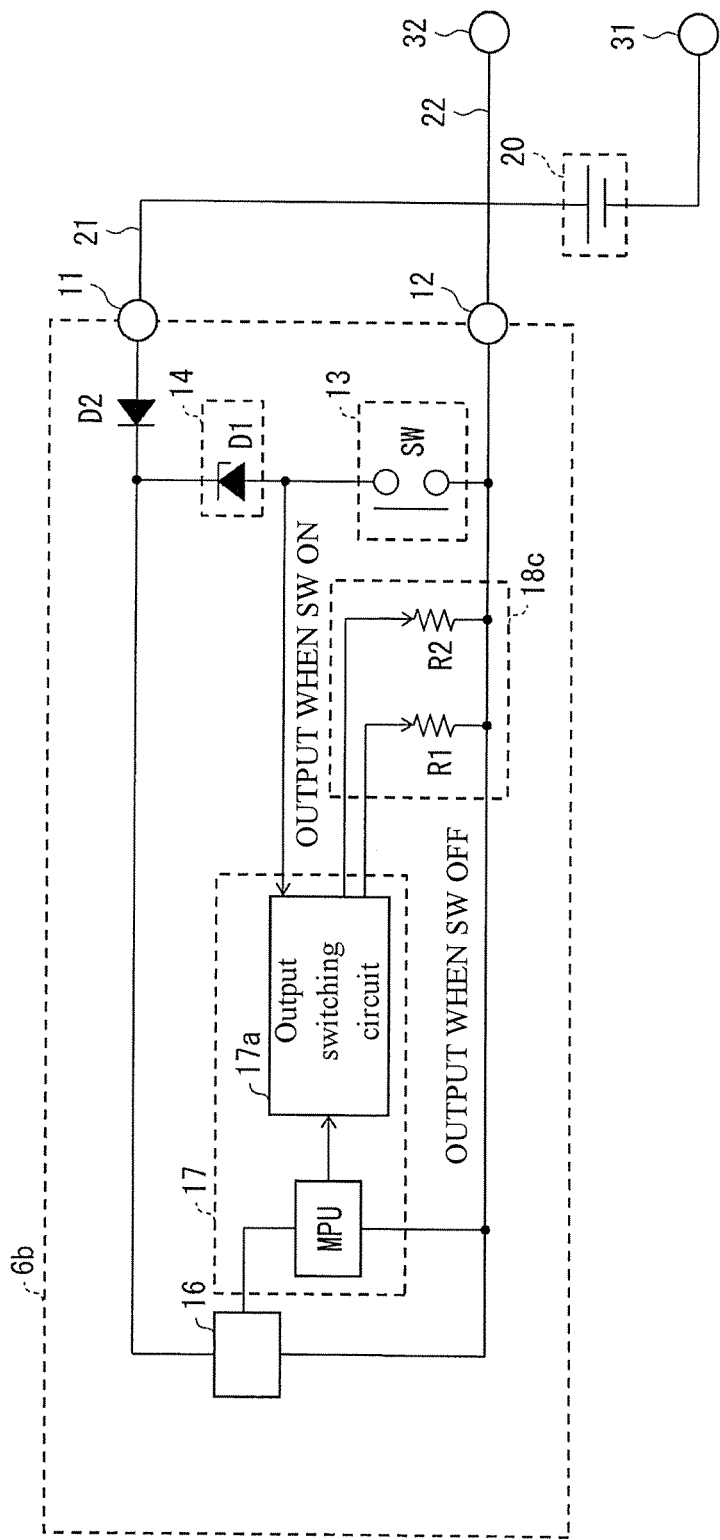
FIG. 14 is a circuit diagram illustrating a modified example of an electrical device.

FIG. 14 is a circuit diagram showing a configuration of the electrical device 6a according to the modified example. Here, a superimposing circuit 18c includes the resistor R2 (the current output) instead of the transistor TR1 and the diode D3 (the voltage output) of the superimposing circuit 18. An amplitude Vpp and a current I of a waveform of the data signal are as follows.

$$Vpp = I \cdot Ri,$$

$$I = Vm/(R1 \text{ or } R2).$$

Here, Ri is a resistance value of the input unit 4 (or the output unit 5) side, and Vm is an output voltage from the output switching circuit 17a (a value obtained by subtracting a drop voltage at the MPU from a constant voltage supplied by the step-down circuit 16). Resistance values of the resistors R1 and R2 are represented by R1 and R2. When a resistor connected to the second input terminal 32 is provided in the input unit 4, it is unnecessary to differentiate a current value of the data signal on the electrical device 6b side by ON/OFF states, and the resistors R1 and R2 can be omitted.

The output switching circuit 17a is omitted in the electrical device 6, and the superimposing circuit 18a may switch a circuit to be operated in accordance with whether the switch SW is on or off.

The input part can also be configured to input a negative constant potential to the second terminal 12 of the electrical device 6 without changing the configuration of the electrical device 6. In this case, the power supply 20 is arranged in the path of the signal line 22. The electrical device 6 transmits the superimposed signal from the first terminal 11 and the input unit receives the superimposed signal from the first input terminal 31. In this case, one end of the capacitor C21 is connected to the first input terminal 31.

The above also applies to another electrical device.

In the case of the electrical device 7 (a sensor), a block configuration in which the switch SW of the electrical device 6 in FIG. 1 is replaced with a sensing element is provided. The output signal is a signal representing the sensing result of the sensing element. For example, the sensing result indicates the presence or absence of light reception if the sensing element is a photoelectric element such as a photodiode. Since operations of other circuits are the same as those described above, a detailed description will be omitted.

Configuration of Electrical Device 8 and Output Unit 5

The electrical device 8 and the output unit 5 will be described below. For convenience of explanation, constituent elements which have the same function as those described above will be denoted with the same reference numerals and description thereof will be omitted.

Figure 10:
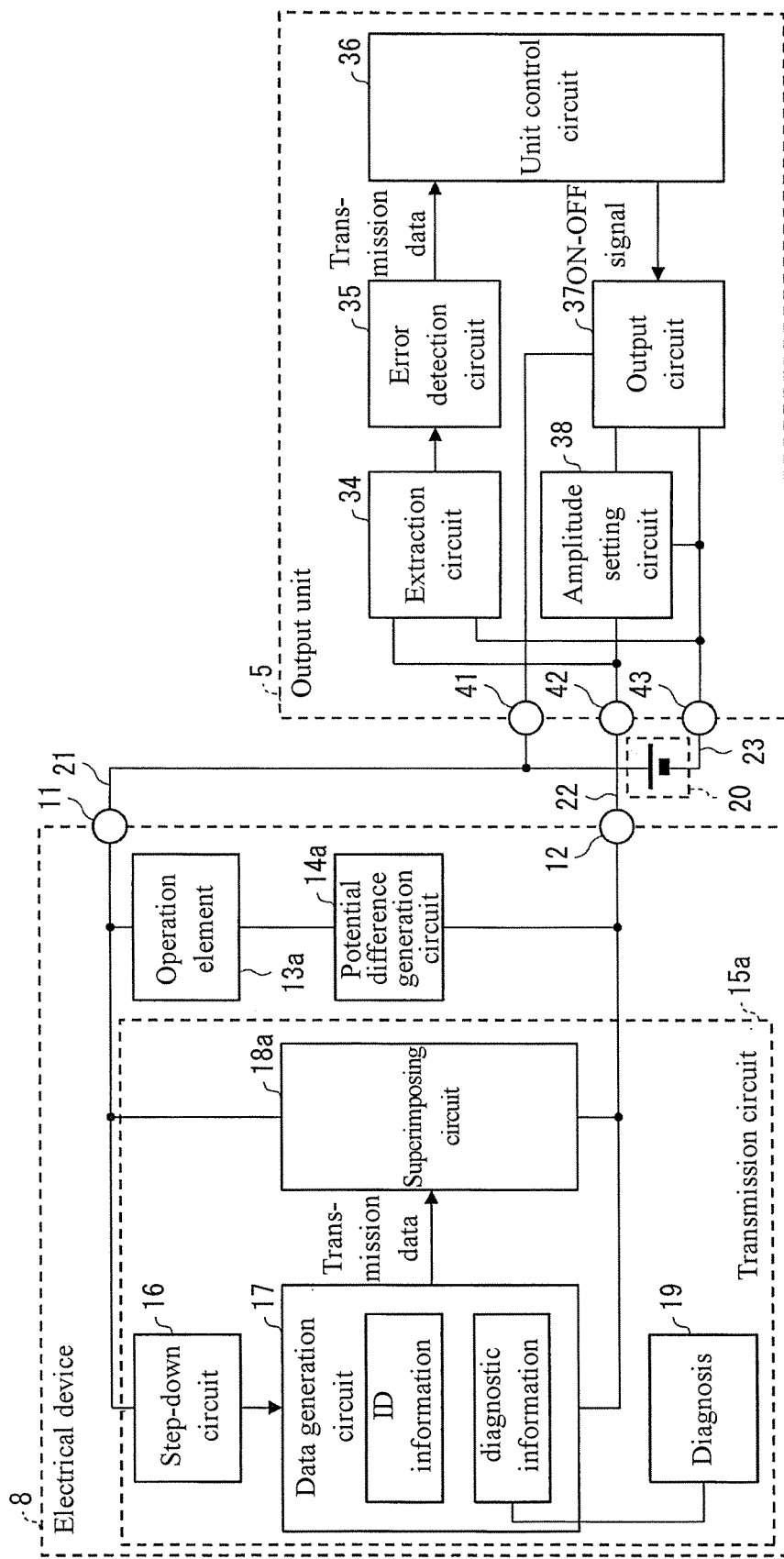
FIG. 10 is a block diagram showing a configuration of an electrical device and an output unit.

FIG. 10 is a block diagram showing a configuration of the electrical device 8 and the output unit 5. Here, the electrical device 8 (a relay) and the output unit 5 will be described as an example. The electrical device 8 and the output unit 5 are connected to each other through a pair of signal lines 21 and 22. The signal line 21 is connected to a first output terminal 41 of the output unit 5 and the first terminal 11 of the electrical device 8. The signal line 22 is connected to a second output terminal 42 of the output unit 5 and the second terminal 12 of the electrical device 8. The first output terminal 41 and a third output terminal 43 of the output unit 5 are connected to each other by a signal line 23. The power supply 20 is provided in a path of the signal line 23. The power supply 20 is a DC power supply configured to generate a predetermined voltage (here, 24 V).

The electrical device 8 includes the first terminal 11, the second terminal 12, an operation element 13a, a potential difference generation circuit 14a, and a transmission circuit 15a. The transmission circuit 15a includes a step-down circuit 16, a data generation circuit 17, a superimposing circuit 18a, and a diagnosis circuit 19. The operation element 13a is connected between the first terminal 11 and the second terminal 12. The potential difference generation circuit 14a is connected in series to the operation element 13a in a conduction path between the first terminal 11 and the second terminal 12. A potential of the second terminal 12 varies in accordance with a control signal (an operation signal) for controlling the operation element 13a. The control signal is input from the outside (the output unit 5) to the second terminal 12.

The transmission circuit 15a is connected between the first terminal 11 and the second terminal 12. The transmission circuit 15a operates using a voltage between the first terminal 11 and the second terminal 12 as a power source. The step-down circuit 16 steps down the voltage between the first terminal 11 and the second terminal 12 to a predetermined voltage and outputs the predetermined voltage to the data generation circuit 17. The data generation circuit 17 operates by a voltage applied from the step-down circuit 16 and generates transmission data to be transmitted to the output unit 5. The transmission data contains, for example, a proper identifier to the electrical device 8. The data generation circuit 17 outputs the transmission data to the superimposing circuit 18a. The superimposing circuit 18a superimposes the received transmission data on the control signal as a data signal. Thus, the transmission circuit 15a superimposes the data signal on the control signal and outputs the same from the second terminal 12 to the signal line 22.

The diagnosis circuit 19 operates by a voltage applied from the step-down circuit 16 and generates diagnostic data representing diagnostic information of the electrical device 8.

The output unit 5 includes the first output terminal 41, the second output terminal 42, the third output terminal 43, an output circuit 37, an amplitude setting circuit 38, an extraction circuit 34, an error detection circuit 35, and a unit control circuit 36. In FIG. 10, a configuration of a transmission part to a controller 3 is not shown. A potential of the third output terminal 43 is kept constant (for example, GND). A control signal is output from the second output terminal 42 to the signal line 22. A potential of the first output terminal 41 is maintained at a predetermined potential (24 V) by the power supply 20.

The unit control circuit 36 outputs a signal (an ON/OFF signal) related to control of the electrical device 8 to the output circuit 37 based on instructions from the PC 2 and the controller 3. Furthermore, the unit control circuit 36 outputs the data signal to the controller 3. The output circuit 37 generates a control signal for controlling the electrical device 8 based on the signal received from the unit control circuit 36 and outputs the control signal to the amplitude setting circuit 38. The amplitude setting circuit 38 sets an amplitude of the control signal by changing a potential output to the second output terminal 42 in accordance with an H/L state of the control signal. The extraction circuit 34 extracts a data signal from a superimposed signal and outputs the data signal to the error detection circuit 35.

Circuit Configuration of Electrical Device 8

Figure 11:
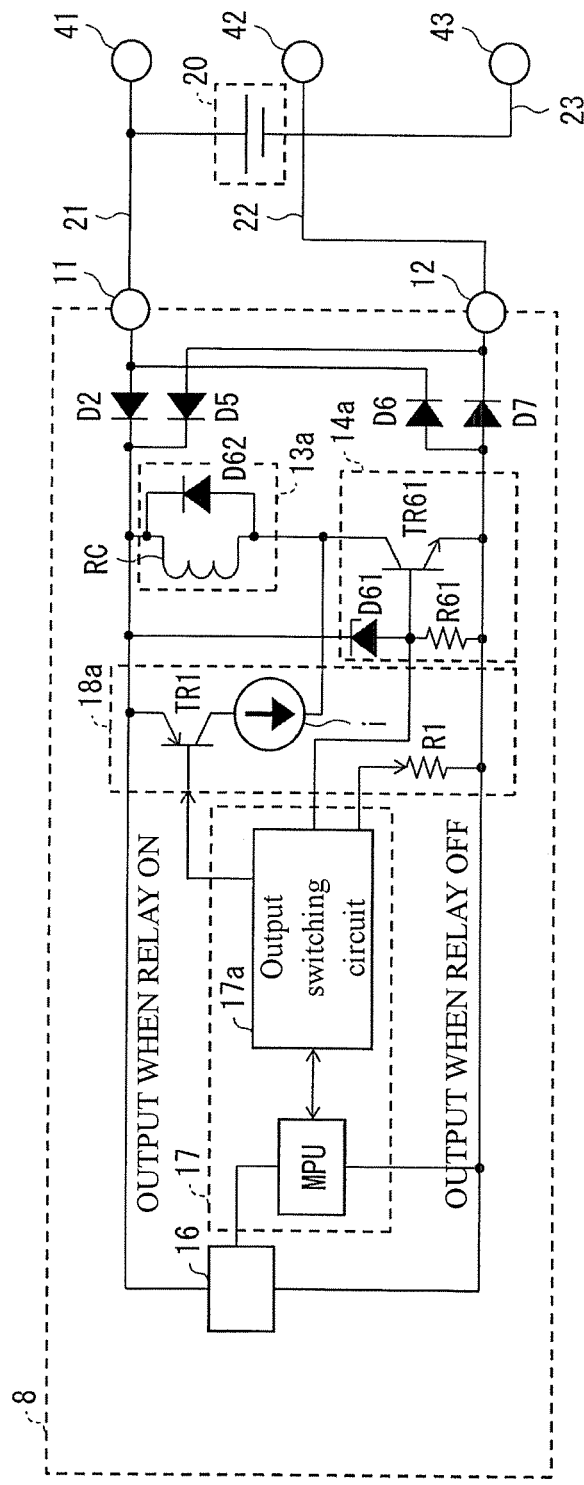
FIG. 11 is a circuit diagram showing a configuration of an electrical device.

FIG. 11 is a circuit diagram showing a configuration of the electrical device 8. In FIG. 11, the diagnosis circuit 19 is not shown. The potential difference generation circuit 14a includes a diode D61, a resistor R61, and a transistor TR61. The diode D61 is a Zener diode. Here, the operation element 13a includes a relay coil RC configured to operate a relay and a diode D62 connected in parallel to the relay coil RC. The diode D2, the relay coil RC, the transistor TR61 (a collector terminal-an emitter terminal), and a diode D7 are arranged in series in this order in a conduction path between the first terminal 11 and the second terminal 12. A cathode of the diode D61 is connected to a cathode of the diode D2. One end of the resistor R61 is connected to an anode of the diode D61 and a base terminal of the transistor TR61. The other end of the resistor R61 is connected to an anode of the diode D7. An anode of the diode D5 is connected to the second terminal 12 and a cathode of the diode D5 is connected to the cathode of the diode D2. A cathode of the diode D6 is connected to the first terminal 11 and an anode of the diode D6 is connected to the anode of the diode D7.

The diodes D2 and D5 to D7 are protective elements and can be omitted.

The superimposing circuit 18a includes the resistor R1, the constant current circuit i, and the transistor TR1. The emitter terminal of the transistor TR1 is connected to the first terminal 11 via the diode D2 and the collector terminal of the transistor TR1 is connected to an anode of the constant current circuit i. The base terminal of the transistor TR1 is connected to the output switching circuit 17a. A cathode of the constant current circuit i is connected to a collector terminal of the transistor TR61.

Circuit Configuration of Output Unit 5

Figure 12:
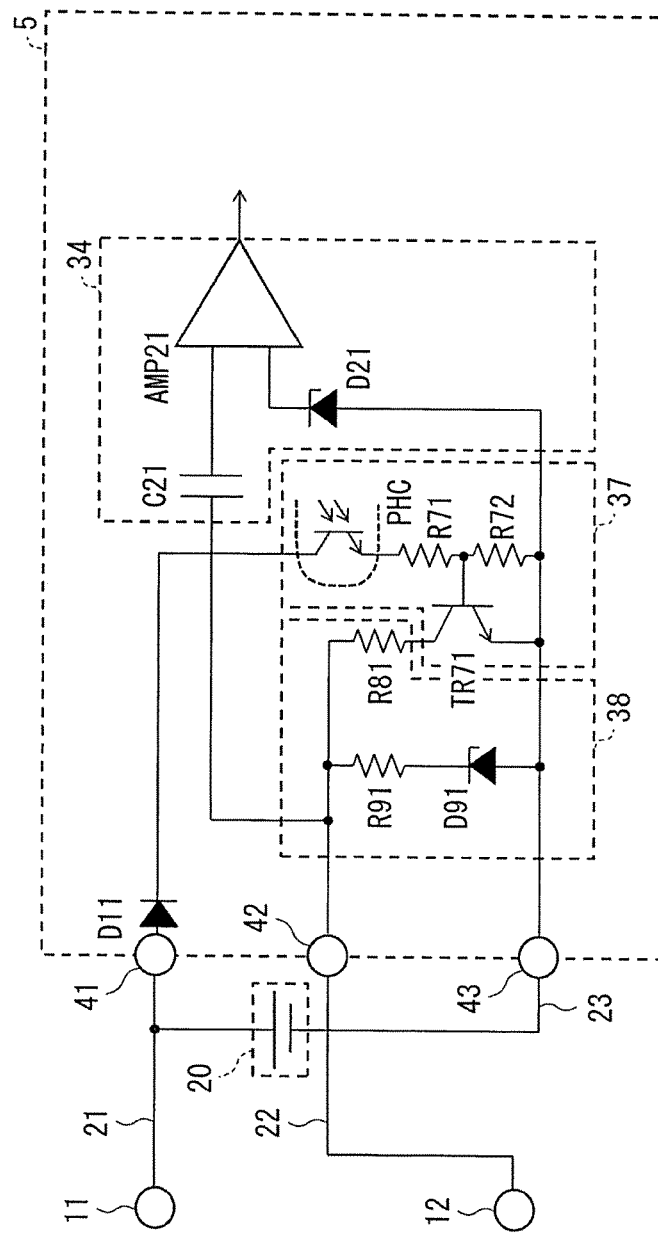
FIG. 12 is a circuit diagram showing a configuration of an output unit.

FIG. 12 is a circuit diagram showing a configuration of the output unit 5. Here, the output circuit 37, the amplitude setting circuit 38, and the extraction circuit 34 in the output unit 5 are shown. The extraction circuit 34 is the same as the extraction circuit 34 of the input unit 4.

The output circuit 37 includes resistors R71 and R72, a transistor TR71, and a phototransistor PHC. The anode of the diode D11 is connected to the first output terminal 41. The phototransistor PHC and the resistors R71 and R72 are arranged in series in this order between the cathode of the diode D11 and the third output terminal 43. A base terminal of the transistor TR71 is connected to a node between the resistor R71 and the resistor R72. An emitter terminal of the transistor TR71 is connected to the third output terminal 43. A collector terminal of the transistor TR71 is connected to the second output terminal 42 via a resistor R81. An ON/OFF signal (a signal for instructing to turn on/off the operation element 13a) is input as an optical signal from the unit control circuit 36 to the phototransistor PHC.

The amplitude setting circuit 38 includes resistors R81 and R91 and a diode D91 as impedance elements. The diode D91 is a Zener diode. The resistor R81 and the transistor TR71 are arranged in series in this order between the second output terminal 42 and the third output terminal 43. One end of the resistor R91 is connected to the second output terminal 42. The other end of the resistor R91 is connected to a cathode of the diode D91. An anode of the diode D91 is connected to the third output terminal 43.

Operation of Electrical Device 8 and Output Unit 5

The electrical device 8 is a relay. ON/OFF (conduction/cutoff) of an electrical contact is switched in accordance with whether a current flowing through the relay coil RC is equal to or larger than a threshold value. The third output terminal 43 of the output unit 5 is set to 0 V, and a constant potential (24 V) is input to the first terminal 11. A potential of the second terminal 12 changes in accordance with a control signal transmitted from the output unit 5.

An ON signal is input to the phototransistor PHC in the output circuit 37 when the relay is on. Thus, the transistor TR71 is on and a current flows through the resistor R81. At this time, a potential of the second output terminal 42 becomes an L state. Therefore, the voltage between the second output terminal 42 and the first output terminal 41 becomes a large first voltage. The L potential of the second output terminal 42 is input to the second terminal 12 of the electrical device 8 as a control signal via the signal line 22.

In the electrical device 8, the first voltage is applied between the first terminal 11 and the second terminal 12 so that the transistor TR61 is on (conducted). For this reason, the current equal to or greater than the threshold value flows to the relay coil RC. Thus, the relay is on.

An OFF signal is input to the phototransistor PHC in the output circuit 37 when the relay is off. Thus, the transistor TR71 is off and the potential of the second output terminal 42 becomes an H state. However, since a current flows through a path of the resistor R91 and the diode D91, the potential of the second output terminal 42 has a value lower than the potential of the first output terminal 41. Therefore, the voltage between the second output terminal 42 and the first output terminal 41 is a second voltage smaller than the first voltage (but larger than 0). The second voltage is a voltage (for example, 5 V) at which the transmission circuit 15a can operate. The H potential of the second output terminal 42 is input to the second terminal 12 of the electrical device 8 as a control signal via the signal line 22. In this way, the amplitude setting circuit 38 generates a voltage for supplying electric power to the electrical device 8 when the control signal is off.

In the electrical device 8, the second voltage is added between the first terminal 11 and the second terminal 12 so that no current flows in the diode D61 and thus the transistor TR61 is off (cutoff). For this reason, no current flows in the relay coil RC. Thus, the relay is off.

In this way, the second terminal 12 receives a control signal for controlling the relay coil RC from the outside. The relay is controlled to be on if a voltage of the control signal is equal to or larger than a threshold value (for example, the first voltage). The relay is controlled to be off if the voltage of the control signal is smaller than a threshold value (for example, the second voltage). Since ON/OFF of the relay is controlled by a magnitude itself of the voltage of the control signal, it can be said that the control signal is an analog signal.

On the other hand, a potential difference is generated at both ends of the potential difference generation circuit 14a regardless of the voltage of the control signal. For this reason, a voltage equal to or greater than a certain value is applied to the step-down circuit 16 regardless of whether the relay is on or off. Therefore, the step-down circuit 16 can output at least a voltage (2.5 V) at which the MPU and the output switching circuit 17a can operate regardless of the operation state of the relay coil RC. Thus, the data generation circuit 17 and the superimposing circuit 18a can operate regardless of the operation state of the relay coil RC.

A potential of a node between the diode D61 and the resistor R61 is input to the output switching circuit 17a. The output switching circuit 17a determines whether the control signal is on or off (whether the relay is on or off) based on the potential.

The output switching circuit 17a outputs transmission data to the resistor R1 when the relay is off. As a result, the transmission data is superimposed on the control signal as a data signal. The electrical device 8 outputs the data signal superimposed on the control signal from the second terminal 12.

The output switching circuit 17a outputs transmission data to the base terminal of the transistor TR1 when the relay is on. The transistor TR1 enters an ON or OFF state in accordance with an H/L state of the transmission data. At this time, whether a current flows through the constant current circuit i changes in accordance with the H/L state of the transmission data. Thus, a potential of the second terminal 12 also changes in accordance with the H/L state of the transmission data. As a result, the transmission data is superimposed on the control signal as a data signal. An amplitude of the data signal is smaller than an amplitude of the control signal.

The output unit 5 receives the data signal superimposed on the control signal from the second output terminal 42. The extraction circuit 34 extracts the data signal from the superimposed signal and outputs the data signal to the error detection circuit 35.

Effect

The same effect as that of the electrical device 6 can also be obtained in the electrical device 8. In the electrical device 8, the transmission circuit 15a operates by a voltage of the pair of signal lines 21 and 22 for receiving the control signal as a power source. The transmission circuit 15a can generate a data signal indicating information different from the control signal and transmit the data signal to the output unit 5. For this reason, there is no need to provide another power supply configured to operate the transmission circuit 15a in the electrical device 8 and to connect another wiring configured to supply electric power to the electrical device 8. Therefore, the electrical device 8 can simultaneously receive the control signal and transmit the data signal with fewer wirings than the conventional electrical device (with the pair of signal lines 21 and 22).

Modified Example

Also, in the electrical device 8, like the electrical devices 6 to 6b, the voltage output and the current output may be exchanged or both may be a voltage output or a current output.

Also, in the electrical device 8, the data signal is extracted by only one extraction circuit 34 regardless of whether the control signal is on or off. The disclosure is not limited thereto, and an extraction circuit configured to operate when the control signal is on and an extraction circuit configured to operate when the control signal is off may be provided as separate circuits. It may be necessary to set a resistance value of the resistor R81 much lower than a resistance value of the resistor R91 in some cases depending on the conditions of the product. In this case, an amplitude of the data signal (when the control signal is on) decreases via the resistor R81. In the case in which the data signal has different amplitudes when the control signal is on and when the control signal is off, a plurality of extraction circuits having threshold values matching data signals may be provided in parallel with each other to prevent a malfunction of the extraction circuit.

In the output unit 5, the collector terminal of the phototransistor PHC is connected to the first output terminal 41, but the disclosure is not limited thereto. The collector terminal may be connected to the other end of the resistor R81. In this case, the first output terminal 41 and the resistor R71 can be omitted.

The output unit can also be configured to input a negative constant potential to the second terminal 12 of the electrical device 8 without changing the configuration of the electrical device 8. In this case, the power supply 20 is arranged in a path of a signal line configured to connect the first output terminal 41 and the third output terminal 43 and the second terminal 12 and the third output terminal 43 are connected through another signal line. The electrical device 8 transmits the superimposed signal from the first terminal 11 and the output unit receives the superimposed signal from the second output terminal 42.

The electrical device 9 (an electromagnetic valve) and the electrical device 10 (an electric actuator) can have the same configuration.

In the case in which the relay is a contactless relay (for example, a solid state relay), an electrical device includes a semiconductor switching element instead of the relay coil RC. ON/OFF of the semiconductor switching element is controlled by a control signal. Alternatively, a photocoupler may be provided as an operation element. In this case, the photocoupler transmits ON/OFF information of the control signal to a switching element to switch the switching element on/off.

The electrical device may be a light emitting device (for example, a warning lamp, an indicator light, and the like). In this case, a light emitting element such as a light emitting diode is provided as an operation element. Light emitting/non-light emitting states of the light emitting device are switched in accordance with the control signal.

Implementation Example Using Software

Processes of the PC 2 (an information processing device), the data generation circuit 17, the diagnosis circuit 19, the error detection circuit 35, and the unit control circuit 36 may be realized by a logical circuit (hardware) formed in an integrated circuit (an IC chip) or the like and may be realized by software using a central processing unit (CPU).

In the latter case, the PC 2, the data generation circuit 17, the diagnosis circuit 19, the error detection circuit 35, and the unit control circuit 36 include the CPU configured to execute a command of a program serving as software configured to realize each function, a read only memory (ROM) or a storage device (which are referred to as a "recording medium") in which the program and various data are recorded to be readable by a computer (or the CPU), a random access memory (RAM) configured to develop the program, and the like. Moreover, the computer (or the CPU) reads the program from the recording medium and executes the program so as to achieve the disclosure. Examples of the recording medium may include a "non-transitory tangible medium," for example, a tape, a disk, a card, a semiconductor memory, a programmable logic circuit, or the like. Furthermore, the program may be supplied to the computer via an arbitrary transmission medium (a communication network, a broadcast wave, or the like) capable of transmitting the program. An embodiment of the disclosure can also be realized in the form of a data signal being embedded in a carrier wave in which the program is embodied by electronic transmission.

The disclosure is not limited to the above-described embodiments, but various modifications are possible within the scope described in the claims, and embodiments obtained by appropriately combining technical means disclosed in different embodiments are also included in the technical scope of the disclosure.

What is claimed is:

1. An electrical device comprising:
   a first terminal and a second terminal to which a pair of signal lines is connected;
   an operation element connected between the first terminal and the second terminal;
   a transmission circuit configured to operate using a voltage between the first terminal and the second terminal as a power source; and a potential difference generation circuit connected in series to the operation element in a conduction path between the first terminal and the second terminal, wherein a predetermined potential is input to the first terminal, the second terminal transmits an operation signal according to a state of the operation element to outside or an operation signal for controlling the operation element is input from the outside to the second terminal, the transmission circuit superimposes a data signal on the operation signal and transmits the data signal from the second terminal to the outside, and the transmission circuit operates by a potential difference generated across both ends of the potential difference generation circuit.

2. The electrical device according to claim 1, wherein the second terminal transmits the operation signal according to the state of the operation element to the outside.

3. The electrical device according to claim 2, wherein the operation element is a switch, and the operation signal is a signal representing an on or off state of the switch.

4. The electrical device according to claim 3, wherein the transmission circuit transmits the data signal to the outside only when the switch enters one of on and off states.

5. The electrical device according to claim 3, wherein the transmission circuit transmits the data signal to the outside regardless of whether the switch is on or off.

6. The electrical device according to claim 2, wherein the operation element is a sensing element, and the operation signal is a signal representing a sensing result by the sensing element.

7. The electrical device according to claim 1, wherein the operation signal for controlling the operation element is input from the outside to the second terminal.

8. The electrical device according to claim 7, wherein the operation element is a coil, a semiconductor switching element, or a light emitting element.

9. The electrical device according to claim 8, wherein the operation element is a coil configured to operate a relay, an electromagnetic valve, or an electric actuator.

10. The electrical device according to claim 1, wherein the potential difference generation circuit comprises a resistor, a transistor, or a diode.

11. The electrical device according to claim 1, wherein the transmission circuit comprises:

a step-down circuit configured to step down the potential difference generated across both ends of the potential difference generation circuit to a predetermined voltage and to output the predetermined voltage to a data generation circuit;

the data generation circuit configured to generate transmission data to be transmitted; and a superimposing circuit configured to superimpose the transmission data as the data signal on the operation signal.

12. The electrical device according to claim 11, wherein wirings connected from the outside are only the pair of signal lines.

13. The electrical device according to claim 12, wherein the transmission circuit operates using the voltage between the first terminal and the second terminal as the power source and does not require another power supply.

14. The electrical device according to claim 13, wherein the data signal represents a proper identifier to the electrical device or diagnostic information of the electrical device.

15. The electrical device according to claim 1, wherein wirings connected from the outside are only the pair of signal lines.

16. The electrical device according to claim 1, wherein the transmission circuit operates using the voltage between the first terminal and the second terminal as the power source and does not require another power supply.

17. The electrical device according to claim 1, wherein the data signal represents a proper identifier to the electrical device or diagnostic information of the electrical device.

18. A receiving device connected to the electrical device according to claim 1 via the pair of signal lines, wherein:

the receiving device receives the data signal superimposed on the operation signal from the electrical device, and the receiving device comprises an extraction circuit configured to extract the data signal from a signal in which the operation signal and the data signal are superimposed.

19. The receiving device according to claim 18, wherein the receiving device comprises an error detection circuit configured to perform error detection on the data signal that is extracted.

* * * * *